United States Patent [19]

Yoshimaru

[11] Patent Number: 4,500,926

[45] Date of Patent: Feb. 19, 1985

[54] DATA-RECORDING APPARATUS

[75] Inventor: Tomohisa Yoshimaru, Yokohama, Japan

[73] Assignee: Tokyo Shibaura Denki Kabushiki Kaisha, Kawasaki, Japan

[21] Appl. No.: 388,504

[22] Filed: Jun. 14, 1982

[30] Foreign Application Priority Data

Jun. 19, 1981 [JP] Japan .................................. 56-93424

[51] Int. Cl.³ .............................................. H04N 7/12
[52] U.S. Cl. .................................... 358/256; 358/260; 371/37
[58] Field of Search ..................... 358/256, 260; 371/2, 371/37

[56] References Cited

U.S. PATENT DOCUMENTS

| 3,273,121 | 9/1966 | Taylor | 371/2 |
|---|---|---|---|
| 3,623,155 | 11/1971 | Hsaio et al. | |
| 4,044,382 | 8/1977 | Yagishita | 358/260 |
| 4,149,142 | 4/1979 | Kageyama et al. | 371/37 |
| 4,270,148 | 5/1981 | Adachi | 358/260 |
| 4,320,511 | 3/1982 | Koga et al. | 371/37 |
| 4,386,373 | 5/1983 | Komdo et al. | 358/260 |

Primary Examiner—John C. Martin
Assistant Examiner—Edward L. Coles
Attorney, Agent, or Firm—Cushman, Darby & Cushman

[57] ABSTRACT

A data recording apparatus has an optical scanner for optically scanning a document and for outputting an image signal corresponding to the document pattern, a modified Huffman coding circuit for compressing the image information output by the optical scanner for each scanning line, and a page buffer memory for storing the image signal compressed by the modified Huffman coding circuit as line image information items. The line image information items are read out from the page buffer memory in units of a fixed number of bits, and are divided into image data pieces of a fixed bit length. Dummy data is added to the terminal end image data which does not have the fixed bit length, thus forming a terminal end image data of the fixed bit length. Error correction data is set for each image data piece.

9 Claims, 9 Drawing Figures

DATA-RECORDING APPARATUS

BACKGROUND OF THE INVENTION

The present invention relates to a data recording apparatus and, more particularly, to a data recording apparatus for a document information filing system.

A document information filing system which uses a magnetic tape or an optical disc is known as a system to replace a microfilm system. In a document information filing system of this type, a document is two-dimensionally scanned by an optical scanner. The image information for each scanning line (line image information item) from the optical scanner is compressed and is then recorded on a magnetic tape or an optical disc. Desired image information written in this manner is retrieved and is expanded for each scanning line. The expanded image information is supplied to a display device and/or electrographic printer which produces a visible image.

Errors tend to be caused in a document information filing apparatus as described above and especially in a document information filing apparatus which uses an optical disc. As a countermeasure to solve this problem of errors, error correction codes are added to the image information. In order to set an error correction code for the image information, the image information must have a fixed bit length. However, the bit length of the image information differs from one scanning line to another and varies within a range of 40 to 2,000 bit length. Thus, an error correction code cannot be set for each scanning line. For this reason, the line image information item is divided into a plurality of image data pieces of a fixed bit length. Then, an error correction code is set for each image data piece. However, with this method, the image data piece corresponding to the terminal end of each scanning line rarely has the fixed bit length. As a result of this, the image data piece at the end of a scanning line frequently contains the image data of the next scanning line. The error correction code is then set for the image data piece including image data from two scanning lines. This results in errors in error correction.

SUMMARY OF THE INVENTION

It is an object of the present invention to provide a data recording apparatus, which sets, with reliability, an error correction code for each image information piece of a fixed bit length including no image data of other line information item, such that errors may not be caused during error correction.

In order to achieve this object, there is provided according to the present invention a data recording apparatus, wherein a line image information item corresponding to at least one scanning line is divided into image data pieces of a fixed bit length, dummy data is added to an image data piece corresponding to the terminal end of the line and of a bit length shorter than the fixed bit length, and an error correction code is set for each image data piece.

DETAILED DESCRIPTION OF THE PREFERRED EMBODIMENTS

Figure 1:
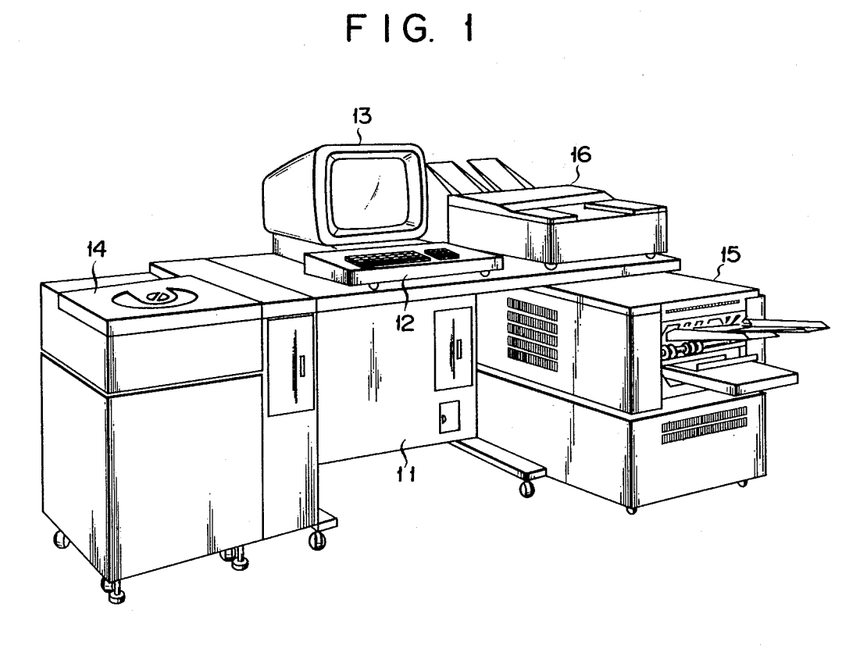
FIG. 1 is a perspective view of a document information filing system including a data recording apparatus according to an embodiment of the present invention.
Figure 2:
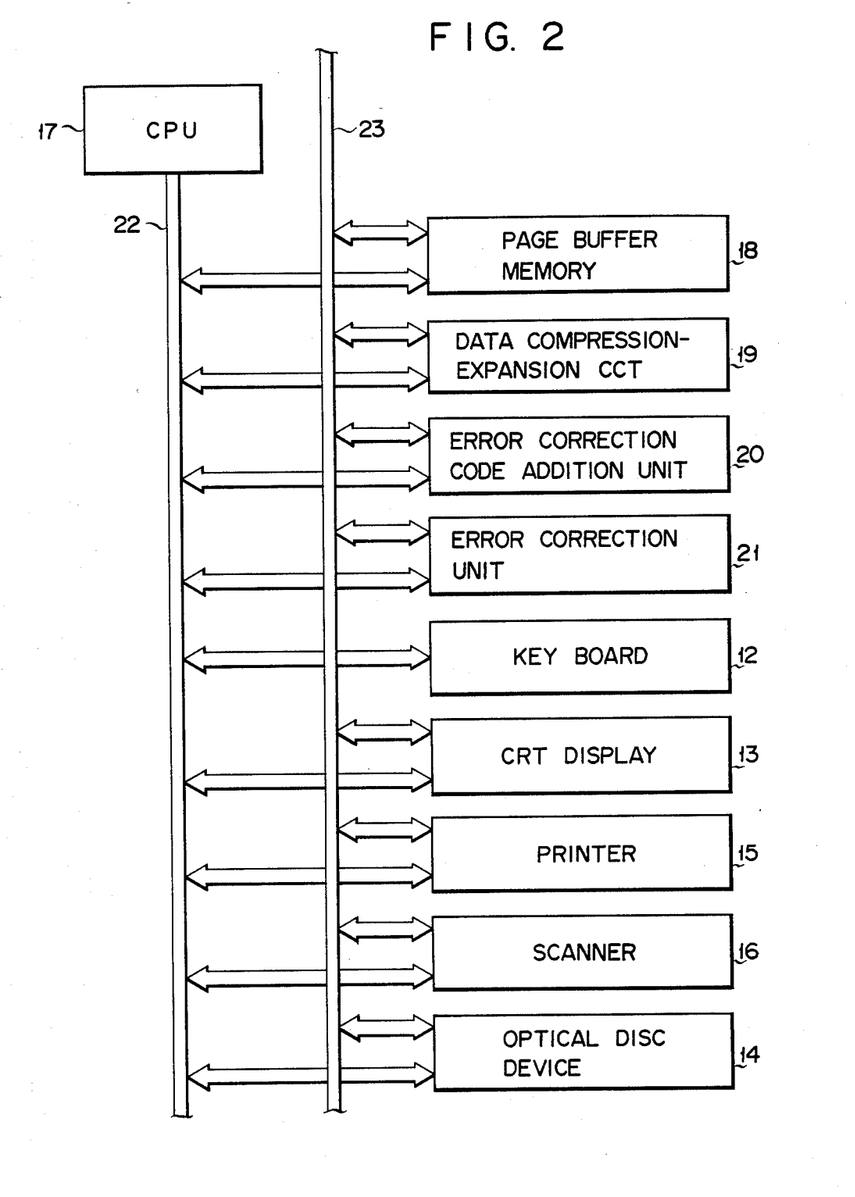
FIG. 2 is a block diagram of the document information filing system shown in FIG. 1.

In a document information filing system shown in FIG. 1, a keyboard 12 and a CRT display 13 are placed on a console 11. An optical disc device 14 is arranged to the left of the console 11. A printer 15 and an optical scanner 16 are arranged to the right of the console 11. As may be seen from the block circuit shown in FIG. 2, the console 11 includes a CPU 17, a page buffer memory 18, a data compression-expansion circuit 19, an error correction code addition unit 20, and an error correction unit 21. The I/O port of the CPU 17 is connected through a control bus 22 to the keyboard 12, the CRT display 13, the optical disc device 14, the printer 15, the optical scanner 16, the page buffer memory 18, the data compression-expansion circuit 19, the error correction code addition unit 20, and the error correction unit 21. An image bus 23 connects the CRT display 13, the optical disc device 14, the printer 15, the optical scanner 16, the page buffer memory 18, the data compression-expansion circuit 19, the error correction code addition unit 20, and the error correction unit 21.

When a document is inserted into the optical scanner 16 and the storing mode is set by the keyboard 12 in the document information filing system described above, the CPU 17 supplies a scanning command to the optical scanner 15. In response to this scanning command, the optical scanner 15 two-dimensionally scans the document and outputs image information corresponding to the pattern on the document. The image information is stored in the page buffer memory 18. After image information of one page of the document is stored in the page buffer memory 18, image information is read out from the page buffer memory 18 in units of scanning lines. The image information for each scanning line or the line image information item is supplied to the data compression-expansion circuit 19 and is compressed by the known, modified Hoffman coding method. The compressed line image information item is then stored in the page buffer memory 18 again. When the compressed line image information items for one page are stored in the page buffer memory 18 in this manner, each line image information item is read out in units of a fixed number of bits, e.g., 32 bits. Then, an 8-bit error correction code is set for each 32-bit image data piece.

Figure 3:
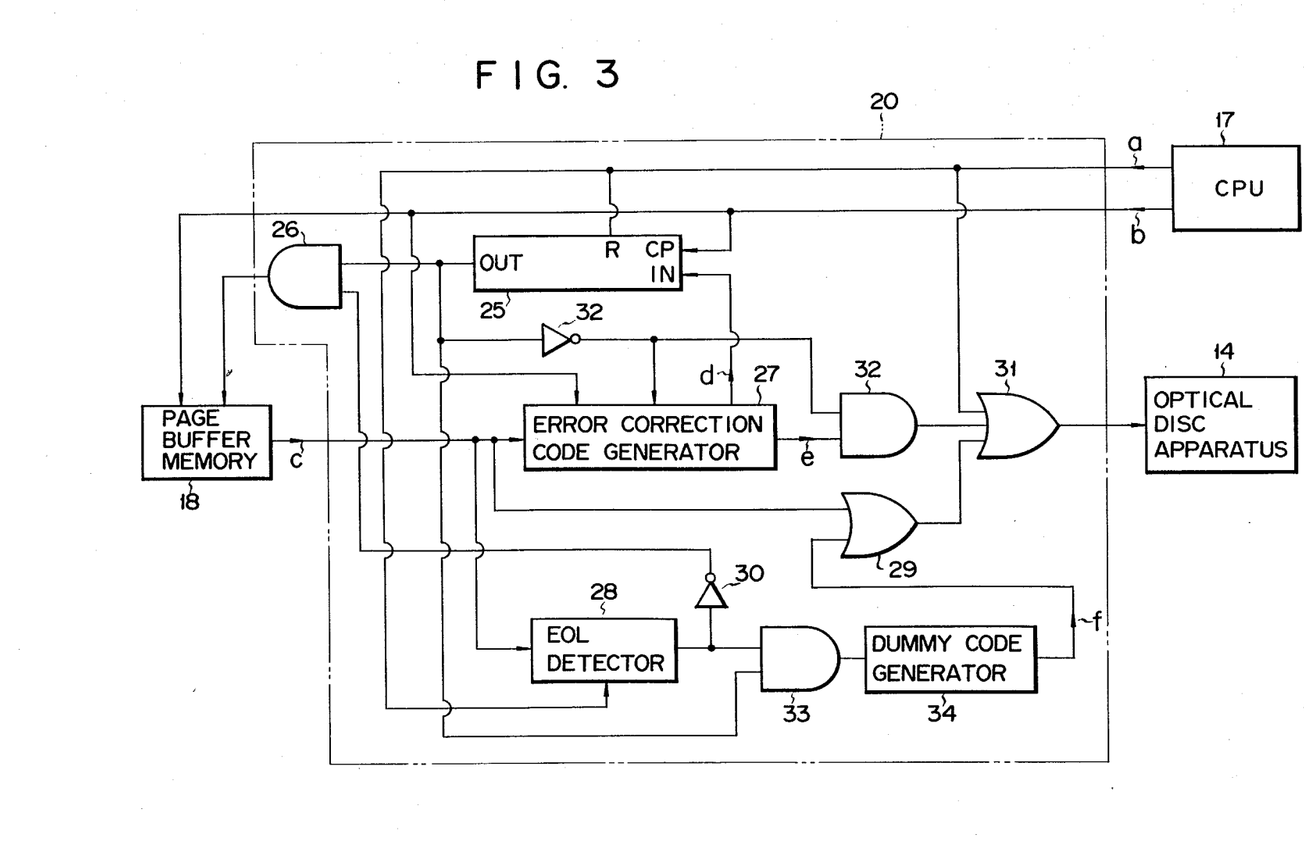
FIG. 3 is a block circuit diagram of an error correction code setting unit shown in the block diagram of FIG. 2.
Figure 4:
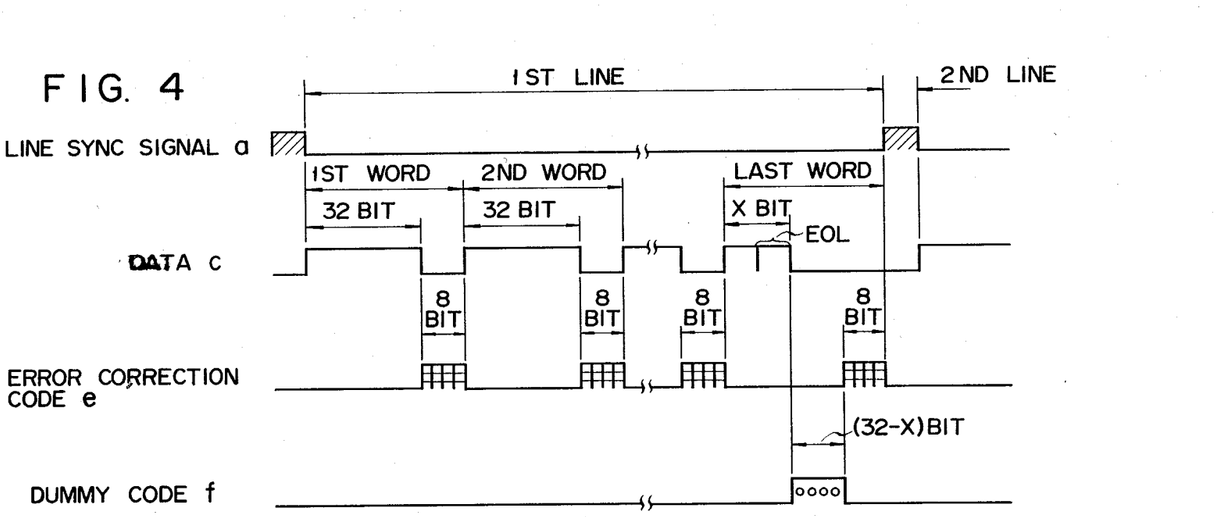
FIG. 4 shows timing charts of signals for explaining the timings at which the image information is recorded.
Figure 5:
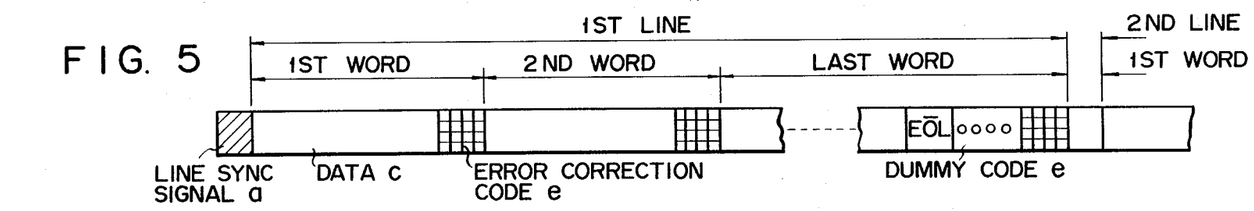
FIG. 5 is a view showing the format of the image information.
Figure 6:
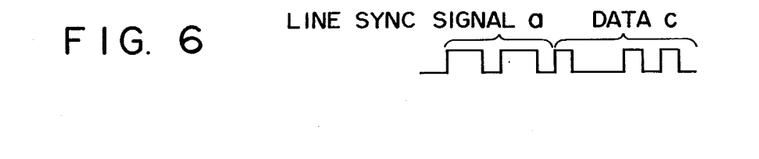
FIG. 6 shows the waveforms of a signal including a line synchronizing signal and an image data signal.

Setting of the error correction code is performed by the error correction code addition unit 20 in the manner to be described below. In the circuitry shown in FIG. 3, when a line synchronizing signal a shown in FIG. 4 is supplied to the reset terminal R of a 32-bit counter 25 of the error correction code addition unit 20, the counter 25 starts counting clock pulses b from the CPU 17. During the counting operation, the counter 25 outputs signal of logic level "1". After counting clock pulses b for one cycle or 32 clock pulses b, the counter 25 outputs a signal of logic level "0". In the initial state, a signal of logic level "0" is supplied to the input terminal IN of the counter 25, and then the counter 25 starts the counting operation. During the counting operation, the signal of logic level "1" from the counter 25 is supplied to the page buffer memory 18 through an AND gate 26. Thus, an image data signal c is read out in units of bits from the page buffer memory 18 in synchronism with the clock pulses b. The readout image data signal c is then supplied to an error correction code generator 27, an END-OF-LINE (EOL) detector 28 and an OR gate 29. Since the EOL detector 28 does not detect an EOL signal at this time, it generates a signal of logic level "0". This signal of logic level "0" is inverted by an inverter 30 and the inverted signal is supplied to the AND gate 26. Thus, the page buffer memory 18 keeps outputting the image data signal c. The image data signal c read out from the page buffer memory 18 is supplied to the optical disc device 14 through OR gates 29 and 31 and is recorded on the optical disc. As described above, upon counting 32 clock pulses b, the counter 25 generates a signal of logic level "0". The signal of logic level "0" from the counter 25 is inverted by an inverter 32 and the inverted signal is supplied to the error correction code generator 27 and to the AND gate 32. When the error correction code generator 27 is set by the inverted signal output from the inverter 32, the error correction code generator 27 supplies a signal d of logic level "1" to the input terminal IN of the counter 25 to lock it and also generates an 8-bit error correction code signal e in synchronism with the clock pulse b from the CPU 17. The 8-bit error correction code signal e is supplied to the optical disc device 14 through the AND gate 32 and through the OR gate 31 and is set after the 32-bit image data. Thus, the 32-bit image data piece and the 8-bit error correction code signal are recorded as one word on the optical disc. When the error correction code generator 27 completes generating the error correction code signal e, the signal d from the error correction code generator 27 goes to logic level "0" to thereby unlock the counter 25. The counter 25 then restarts counting the clock pulses b, and the next 32-bit image data is read out from the page buffer memory 18. In this manner, every time the 32-bit image data is read out, an 8-bit error correction code is set at the end of the 32-bit image data. The line image information item is thus divided into image data pieces of a fixed bit length and is recorded on the optical disc. When the recording operation progresses and the image data corresponding to the terminal end of the line is read out from the page buffer memory 18, an EOL signal contained at the line end is detected by the EOL detector 28. In response to the EOL signal, the EOL detector 28 generates a signal of logic level "1". This signal is inverted by the inverter 30, and closes the AND gate 26 and opens an AND gate 33. Then, readout of the image data from the page buffer memory 18 is interrupted, and a dummy code generator 34 is rendered operative by the output from the AND gate 33. The dummy code generator 34 keeps generating a dummy code signal f until the counter 25 counts 32 clock pulses b. The dummy code signal f is supplied to the optical disc device 14 through the OR gates 29 and 31 to be recorded after the EOL signal. When 32 clock pulses b are counted by the counter 25, the output from the counter 25 goes to logic level "0". Then, the AND gate 33 is closed, and the dummy code generator 34 stops generating the dummy code signal. The error correction code generator 27 then generates an 8-bit error correction code signal e which is set after the (32−X) bit dummy code signal f to complete the final word. In this manner, the first line image information item is recorded on the optical disc as shown in FIG. 5. When the final word of the first line image information item is recorded on the optical disc, the CPU 17 generates another synchronizing signal a. This synchronizing signal a resets the EOL detector 28 to start readout of the image information of the next line. The synchronizing signal a has two pulses as shown in FIG. 6, the pulse width of which is set to be longer than that of the image data signal c. The synchronizing signal a may be differentiated from the image data signal c due to this pulse width difference.

Figure 7:
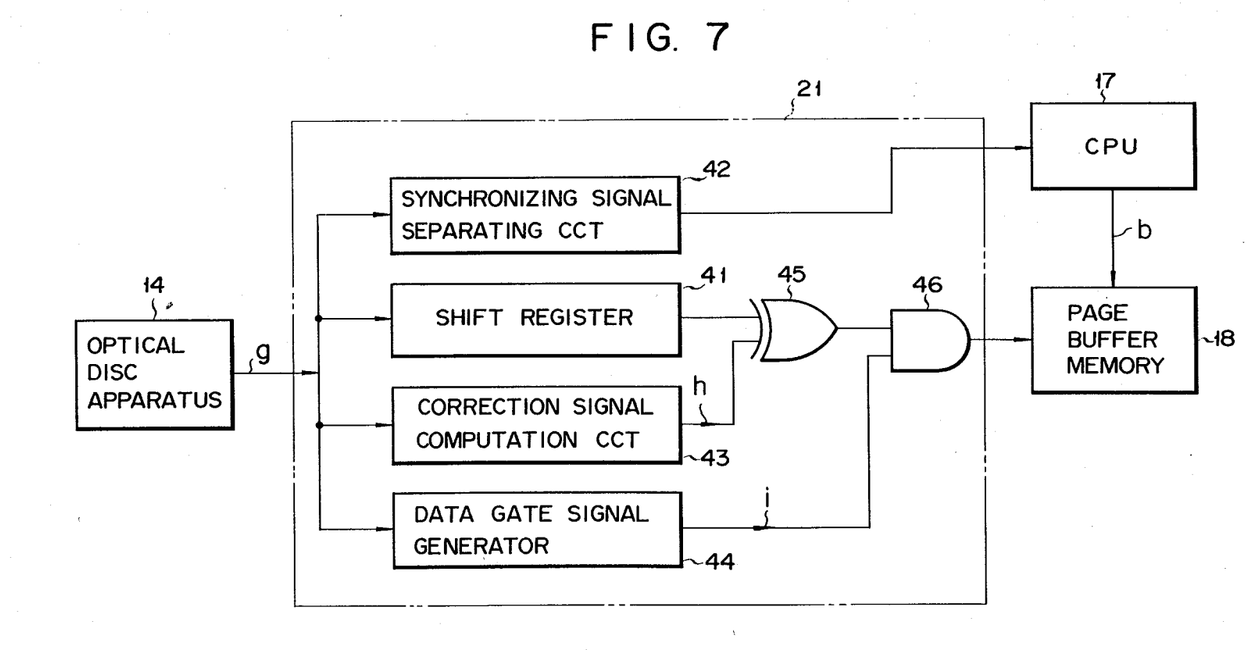
FIG. 7 is a block circuit diagram of an error correction unit.
Figure 8:
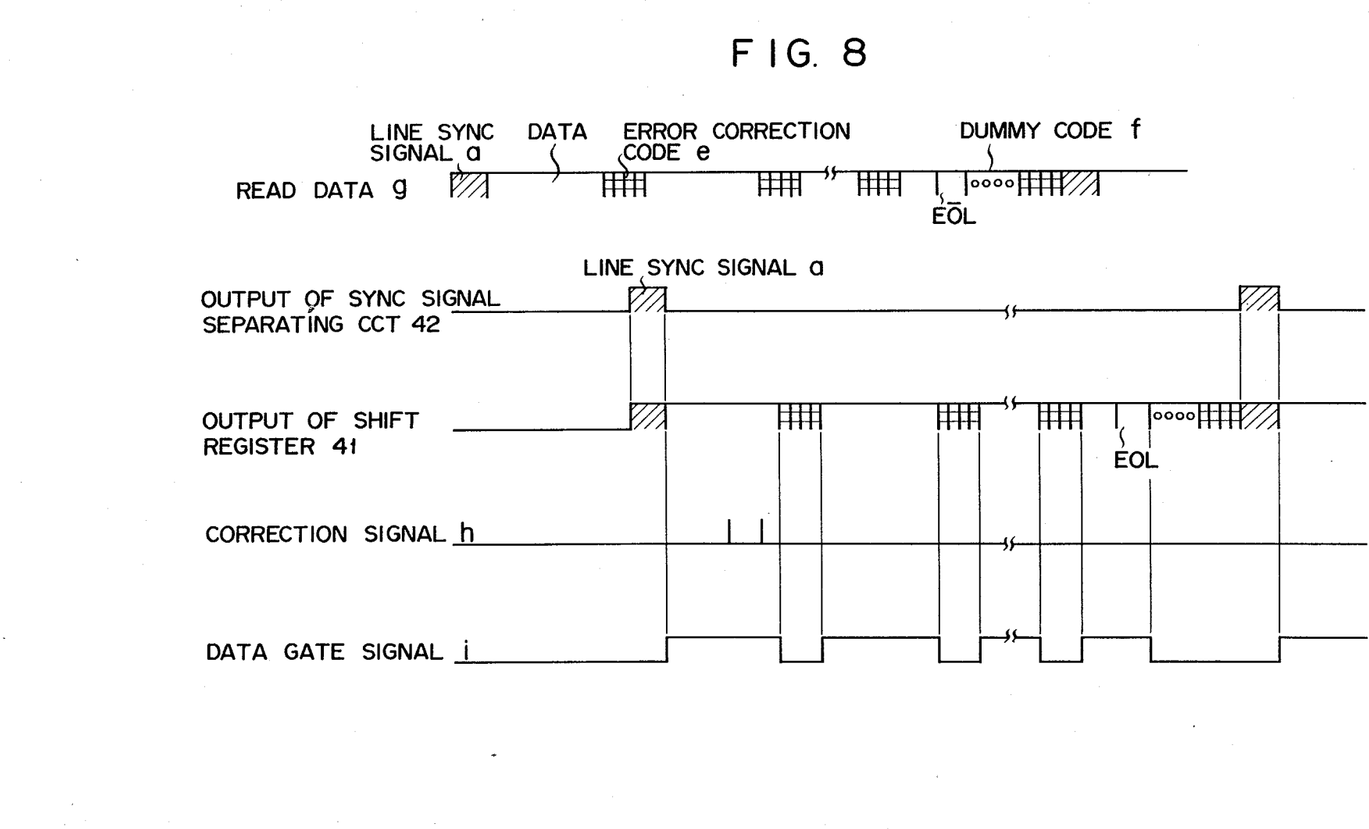
FIG. 8 shows timing charts of signals for explaining the mode of operation of the error correction unit shown in FIG. 7.

The image information recorded on the optical disc is read out in the manner to be described below. An optical disc with the image information recorded thereon is mounted on the optical disc device 14. A retrieval code from the keyboard 12 is input to the document information filing apparatus, and retrieval and read modes are set also through the keyboard 12. Then, the optical disc device 14 starts operating, image information g corresponding to the input retrieval code is retrieved and read out from the optical disc. The readout image information g is stored in the page buffer memory 18 through the error correction unit 21. In the error correction unit 21, the readout image information g is supplied to a shift register 41, a synchronizing signal separating circuit 42, a correction signal computation circuit 43, and a data gate signal generator 44. The shift register 41 temporarily stores the image information g in units of words, and supplies the image data of one word to an exclusive OR gate 45. The synchronizing signal separating circuit 42 separates the synchronizing signal a from the image data, and supplies it to the CPU 17 after a delay time corresponding to the shift time of the shift register 41. The error correction signal computation circuit 43 computes the error correction code signal e according to a conventional method to determine if the image data signal c contains any error. If the image data signal c contains any error, the error correction signal computation circuit 43 outpus an error correction signal h of logic level "1" in synchronism with the output from the shift register 41. The output signal from the error correction signal computation circuit 43 is supplied to the exclusive OR gate 45. In response to a command from the CPU 17, the data gate signal generator 44 generates a data gate signal i of logic level "1" corresponding to the image data signal c within the readout image information g, in synchronism with the output from the shift register 41. The data gate signal i is supplied to an AND gate 46 which outputs only the image data signal c among the image information g output by the exclusive OR gate 45. The image data signal c output from the AND gate 46 is then supplied to the page buffer memory 18. When the image data signal c for one page is stored in the page buffer memory 18, the image data is read out from the page buffer memory 18 in units of scanning lines. The readout image data signal c is supplied to the compression-expansion circuit 19. The compression-expansion circuit 9 expands the image data c according to the modified Hoffman decoding method and is then stored in the page buffer memory 18 again. If the print mode is set through the keyboard 12 at this time, the expanded image data stored in the page buffer memory 18 is supplied to the printer 15 to print out the image. If the display mode is set through the keyboard 12, the expanded image data is displayed at the CRT display 14.

In summary, according to the present invention, a document is scanned with an optical scanner, and the image signals output from the optical scanner are compressed for each scanning line. The line image information item is divided into image data pieces of a fixed length, and an error correction code is set for each image data piece. A dummy code is added to the image data corresponding to the terminal end of each scanning line, so that the terminal word may also be of the fixed bit length. Since the line image information item is divided into a plurality of image data pieces of a completely fixed bit length, image information from adjacent lines does not mix each other, thus preventing errors in error correction.

Figure 9:
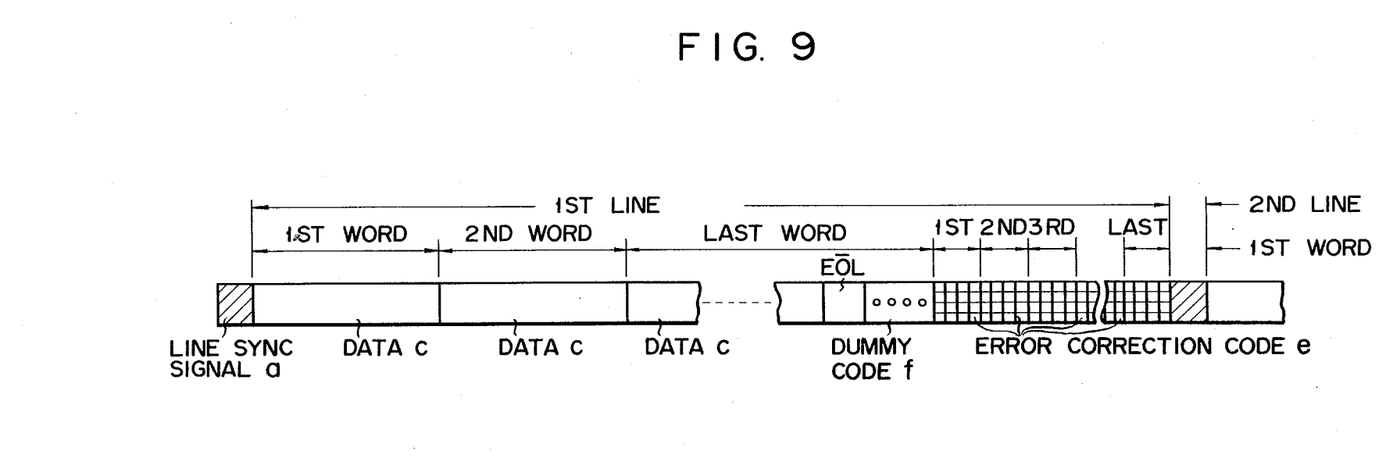
FIG. 9 is a view showing the format of the image information to be recorded by a data recording apparatus according to another embodiment of the present invention.

In the embodiment described above, an error correction code is set for each image data piece of a fixed bit length. However, it is also possible to temporarily store error correction codes each corresponding to image data pieces and to sequentially set the error correction codes after the final words, as shown in FIG. 9. The present invention is not limited to optical disc systems but may be similarly applied to a magnetic recording system.

What is claimed is:

1. A data recording apparatus, comprising:
   an optical scanner for optically scanning a document and for outputting an image signal corresponding to a pattern of the document;
   means for compressing the image signal from said optical scanner and for converting the image signal into a plurality of image information items each corresponding to at least one scanning line;
   means for dividing each of the image information items from said converting means into a plurality of image data pieces of a fixed bit length from an information item end which corresponds to one end of the scanning line;
   means for adding dummy data to the image data piece corresponding to the other end of the scanning line to form a terminal end image data piece of the fixed bit length;
   means for inserting error correction codes into the image data pieces and the terminal end image data piece; and
   means for recording the image data pieces and the error correction codes on a recording medium.

2. A data recording apparatus according to claim 1, wherein;
   said dividing means comprises memory means for storing the image information items as bit data, means for reading out each of the image information items in units of bits, and grouping means for counting the bit data read out by said reading means and for grouping the bit data into the image data piece for each predetermined count.

3. A data recording apparatus according to claim 1 wherein;
   said error correction code inserting means comprises error correction code adding means for adding the error correction codes after the image data pieces and the terminal end image data piece.

4. A data recording apparatus according to claim 1 wherein:
   said means for adding the dummy data comprises means for detecting a terminal end at the other end of the scanning line, means for generating dummy data in response to a detection signal from said detecting means, and means for adding the dummy data from said dummy data generating means to the image data piece so that the image data piece has the fixed bit length.

5. A data recording apparatus according to claim 4, wherein;
   said detecting means comprises means for detecting END-OF-LINE data included at an end of the image data piece corresponding to the other end of the scanning line.

6. A data recording apparatus according to claim 1, wherein;
   the image data piece of the fixed bit length is composed of 32 bits, and the error correction code is composed of 8 bits.

7. A data recording apparatus according to claim 1 wherein;
   said error correction code inserting means sets the error correction codes for a plurality of the image data pieces together after the terminal end image data piece of the plurality of the image data pieces.

8. A data recording apparatus comprising:
   an optical scanner for optically scanning a document and for outputting an image signal corresponding to a pattern of the document;
   mens for forming a plurality of line image information items each composed of bit data and corresponding to a plurality of scanning lines by compressing the image signal from said optical scanner to decrease redundancy of the image signal;
   buffer memory means for storing the line image information items;
   dividing means for dividing each of the line image information items into image data pieces of a fixed bit length after reading out the respective line image information items from said buffer memory means in units of bits;
   means for forming a terminal image data piece of the fixed bit length by detecting a terminal end of the scanning line and adding dummy data to the bit data corresponding to the terminal end;
   means for forming one word by adding an error correction code to each of the image data pieces; and
   means for recording the word on a recording medium.

9. A data recording apparatus according to claim 8, wherein;
   the recording medium is an optical disc.

* * * * *